(12) United States Patent
Lau et al.

(10) Patent No.: US 11,396,248 B2
(45) Date of Patent: Jul. 26, 2022

(54) ANCHOR ATTACHMENT DETECTION SENSORS

(71) Applicant: GM Global Technology Operations LLC, Detroit, MI (US)

(72) Inventors: Eugene J. Lau, Mississauga (CA); Scott D. Thomas, Novi, MI (US); Tricia E. Morrow, Grosse Pointe, MI (US); Dorel M. Sala, Troy, MI (US); Suzanne L. Johansson, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 112 days.

(21) Appl. No.: 17/087,852

(22) Filed: Nov. 3, 2020

(65) Prior Publication Data
US 2022/0134988 A1 May 5, 2022

(51) Int. Cl.
*B60N 2/28* (2006.01)
*B60R 21/015* (2006.01)

(52) U.S. Cl.
CPC .......... *B60N 2/28* (2013.01); *B60R 21/01556* (2014.10); *B60N 2/2809* (2013.01)

(58) Field of Classification Search
CPC . B60N 2/00; B60N 2/002; B60N 2/06; B60N 2/26; B60N 2/28; B60N 2/2809; B60N 2/2887; B60N 2/289; B60R 21/00; B60R 21/01; B60R 21/01556; B60R 21/32; F16F 7/12; G08B 23/00
See application file for complete search history.

(56) References Cited

U.S. PATENT DOCUMENTS

| | | | |
|---|---|---|---|
| 7,021,709 B2 | 4/2006 | Dolan et al. | |
| 7,168,738 B2* | 1/2007 | Garcia, Jr. | B60N 2/002 280/735 |
| 7,401,834 B2 | 7/2008 | Browne | |
| 7,584,998 B2* | 9/2009 | Richter | B60R 22/18 280/808 |
| 7,784,874 B2* | 8/2010 | Murphy | B60R 22/28 297/472 |
| 2016/0144752 A1* | 5/2016 | Frank | B60N 2/2821 297/216.11 |

FOREIGN PATENT DOCUMENTS

| | | |
|---|---|---|
| DE | 19827057 A1 | 12/1999 |
| DE | 19908197 A1 | 1/2000 |

OTHER PUBLICATIONS

NPL Search (May 2, 2022).*

* cited by examiner

*Primary Examiner* — Van T Trieu
(74) *Attorney, Agent, or Firm* — Vivacqua Crane, PLLC

(57) ABSTRACT

An anchor attachment detection sensor for a vehicle including an anchor including an anchor attachment loop bar; a slide mount defining an opening, wherein the slide mount is positioned aft of the anchor attachment loop bar; a slide positioned in the opening of the slide mount, a plate secured to a first end of the slide, a spring, wherein the spring biases the plate against the anchor attachment loop bar; and a sensing device configured to transmit a control signal having a value, wherein the value of the control signal is based on a displacement of a portion of the slide.

20 Claims, 8 Drawing Sheets

ANCHOR ATTACHMENT DETECTION SENSORS

INTRODUCTION

The present disclosure relates to anchor attachment detection sensors for detecting the coupling of child safety seat connectors to lower and upper anchors in child restraint systems.

Safety mechanisms have been incorporated into vehicles for preventing or reducing injury in case of a vehicle crash. Seatbelts, for example, assist in restraining passengers. Airbags, used in combination with seatbelts, provide cushioning and restraint of occupants. Child safety seats, including child restraint seats (CRS) and belt-positioning booster seats, position children within a passenger seat and may be used in conjunction with seatbelts, with lower anchors and tethers for children (LATCH) systems, with only lower anchors, or with a seatbelt and an upper anchor incorporated in vehicle passenger seats, for restraining children in a passenger seat. In addition, various warning indicators may warn the occupants if an occupant is detected but certain parameters have not been met, such as an unbuckled seatbelt.

It has been found, however, that the use of certain safety systems may be redundant or improper. In one example, the deployment of an airbag may generate forces that may be too high upon contact for children secured in a child safety seat or for children below a certain size and weight seated in a passenger seat. Accordingly, systems have been developed to manually and automatically deactivate airbags associated with a given seat. For example, a weight sensing system may be used to automatically deactivate an airbag by sensing and measuring the weight of an occupant in a given seat. If the weight is less than a threshold, the airbag(s) associated with that seat is deactivated. In some situations, however, the combination of a child and a child safety seat may result in a weight measurement that is above the threshold for deactivating the airbags associated with that seat where a manual deactivation is required. In another example is the failure to properly affix a child safety seat to the vehicle via either the vehicle seat belt or LATCH anchors. Yet a further example is the redundant use of a seat belt in combination with the use of the lower anchors of a LATCH system, which may or may not be acceptable based on child safety seat manufacturer and automaker instructions.

Thus, while current passenger restraint systems and safety systems achieve their intended purpose, there remains room for the development of a new and improved detection device and method for sensing a child safety seat secured in a passenger seat.

SUMMARY

According to several aspects, an anchor attachment detection sensor for a vehicle includes an anchor including an anchor attachment loop bar. The anchor attachment detection sensor further includes a slide mount defining an opening is positioned aft of the anchor attachment loop bar and a slide is positioned in the opening of the slide mount, wherein the slide includes a first end and a second end, a plate secured to the first end of the slide, wherein the plate is aft of the anchor attachment loop bar. The anchor attachment detection sensor further includes a spring, wherein the spring biases the plate against the anchor attachment loop bar. The anchor attachment detection sensor also includes a sensing device configured to transmit a control signal having a value, wherein the value of the control signal is based on a location of a portion of the slide.

In a further aspect of the present disclosure, the anchor attachment loop contains at least two anchor attachment loop side arms and the plate is located between the anchor attachment loop side arms.

In yet a further aspect of the present disclosure, the plate includes at least two recesses that slidably interface with the two anchor attachment loop side arms.

In yet a further aspect of the present disclosure, the slide is configured to move parallel to the anchor attachment loop side arms.

In another aspect of the present disclosure, the sensing device is adjacent to the slide and the slide includes a sensible element, wherein the sensing device is configured to detect the sensible element.

In another aspect of the present disclosure, the sensing device is selected from the group consisting of an optical sensor, a proximity sensor, radar, linear variable displacement sensor, an ultrasonic sensor, and a piezoelectric sensor.

In another aspect of the present disclosure, the slide includes a ferromagnetic sensible element and the sensing device is a metallic proximity sensor.

In a further aspect of the present disclosure, slide mount is at least one of a) attached fully supported by the anchor, b) attached to a cross member to which the anchor is attached, and c) attached to a bezel.

In yet a further aspect of the present disclosure, the anchor is secured to a cross member in the vehicle and the slide mount is affixed to the cross member.

In yet a further aspect of the present disclosure, the bezel surrounds the anchor and the slide mount is affixed to the bezel.

In yet a further aspect of the present disclosure, the plate defines a front face that includes a vibration isolation material.

In another aspect of the present disclosure, the spring is a helical spring and the spring defines a tunnel through which the slide passes.

In a further aspect of the present disclosure, the sensing device is connected to a microprocessor control system and the microprocessor control system is configured to execute an algorithm that determines if at least one of the following conditions is present: a) a child safety seat connector is located between the anchor attachment loop bar and the plate, b) nothing is between the anchor attachment loop bar and the plate, or c) a foreign object is located between the anchor attachment loop bar and the plate.

In yet a further aspect, the microprocessor control system is further configured to execute a second algorithm that determines a style of the child safety seat connector connected to the anchor attachment loop bar.

According to several aspects, an anchor attachment system for a vehicle, including a passenger seat and an anchor associated with the passenger seat including an anchor attachment loop bar. The anchor attachment system further includes a slide mount defining an opening, wherein the slide mount is affixed near the anchor and positioned aft of the anchor attachment loop bar and a slide positioned in the opening of the slide mount, wherein the slide includes a sensible device. The anchor attachment system also includes a plate secured to the first end of the slide, wherein the plate is aft of the anchor attachment loop bar. The anchor attachment system further includes a spring, wherein the spring biases the plate against the anchor attachment loop bar. The anchor attachment system yet further includes a sensing device configured to transmit a control signal having a value, wherein the value of the control signal is based on a location of the sensible element.

According to several aspects, a method of detecting the connection of a child safety seat connector to an anchor in a vehicle, includes transmitting a first control signal by a first sensing device, the first control signal having a first control signal value, wherein the first sensing device is configured to measure the displacement of a first plate, wherein the first plate is biased against a first anchor attachment loop bar of a first anchor, receiving the first control signal value with a microprocessor control system coupled to the first sensing device. The method further includes determining if the first control signal value is greater than an installation threshold with the microprocessor control system. If the first control signal value is greater than the installation threshold, determining if a first child safety seat connector is coupled to the first anchor attachment loop bar, if the first control signal is less than the installation threshold but not in a home range determining a foreign object is present between the first anchor attachment loop and the first plate, and if the first control signal value is in the home range, determining that nothing is between the first anchor attachment loop and the first plate.

In further aspects, prior to determining whether the first control signal value is greater than an installation threshold, determining that the first plate is no longer moving and again determining if the first control signal value is greater than the installation threshold.

In another aspect, if the microprocessor control system determines the first control signal value falls within a predetermined range above the installation threshold, the microprocessor control system determines the first child safety seat connector is coupled to the first anchor attachment loop bar.

In a further aspect, the predetermined range determines the style of child safety seat connector connected to the first anchor attachment loop bar.

In a further aspect, the method includes transmitting a second control signal by a second sensing device, the second control signal having a second control signal value, wherein the second sensing device is configured to measure a displacement of the second plate, wherein the second plate is biased against a second anchor attachment loop bar of a second anchor, and receiving the second control signal value with the microprocessor control system coupled to the second sensing device. The method also includes determining if the second control signal value is greater than an installation threshold with the microprocessor control system, if the second control signal value is greater than the installation threshold, determining if a second child safety seat connector is coupled to the second anchor attachment loop bar; and if a second child safety seat connector is coupled to the second anchor attachment loop bar further determining a lapsed time period between the coupling of the first child safety seat connector to the first attachment anchor and the coupling of the second child safety seat connector to the second attachment anchor, wherein if the lapsed time period is greater than a predetermined time period, the microprocessor control system indicates that each of the first child safety seat connector and the second child safety seat connector are using flexible ties and if the lapsed time period is less than a predetermined time period, the microprocessor control system indicates that each of the first child safety seat connector and the second child safety seat connector are using rigid ties.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Anchor attachment systems, such as Lower Anchor and Tether for Children (LATCH) systems, are utilized in vehicles as an alternative or as an additional mechanism to seatbelts for securing child safety seats, including child restraint seats and belt-positioning booster seats, into vehicle passenger seats. Lower anchor and tether systems are also referred to as, e.g., lower universal anchorage systems (LUAS), Universal Child Safety Seat System (UCSSS), CANFIX, or International Organization for Standardization (ISO) standard ISO13216. Lower anchor and tether for children systems generally include lower anchors and an upper anchor affixed to a vehicle and associated with a given passenger seat. The present disclosure is directed to a sensing device, which in aspects can be used with an existing LATCH system, that measures interactions with the sensing device to determine if, for example, a child safety seat is secured to the LATCH system or if a foreign object is present in the LATCH system.

Figure 1A:
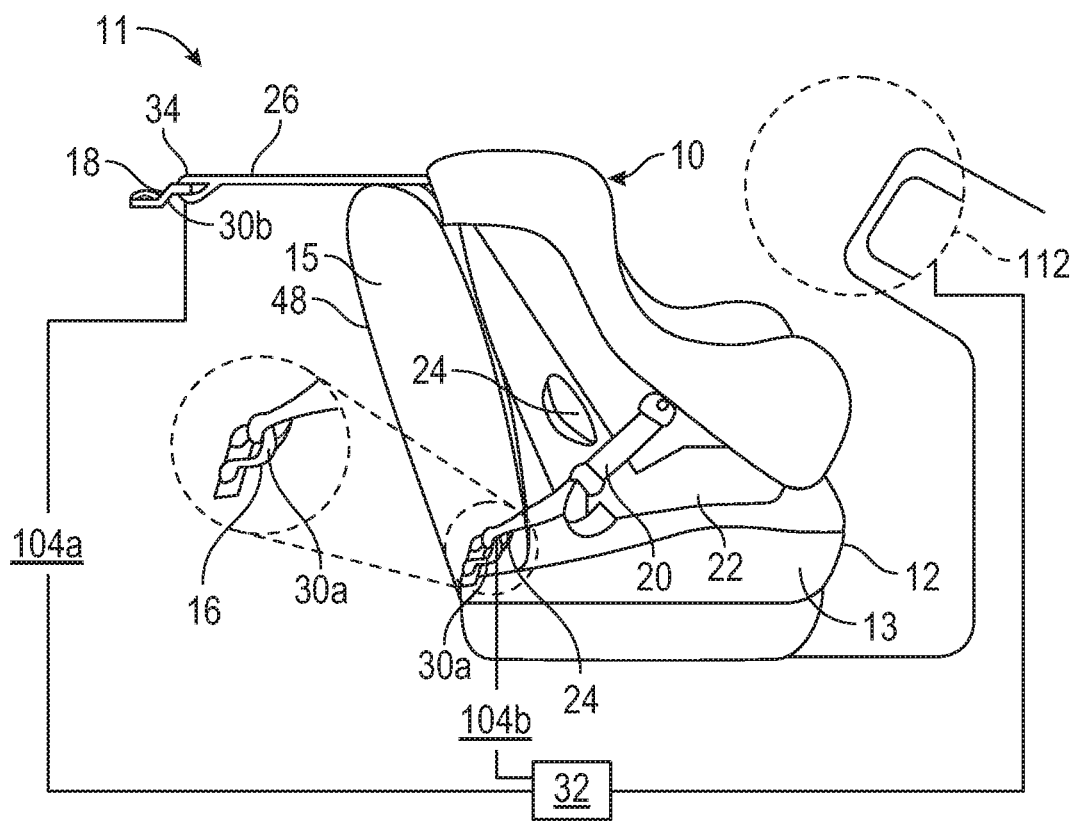
FIG. 1A illustrates a child safety seat secured to a passenger seat in a motor vehicle according to an exemplary embodiment.

Referring to FIG. 1A, a child safety seat 10 and LATCH system 11 are illustrated. In this illustration, the child safety seat 10 is an infant or convertible child safety seat 10 secured in the forward-facing direction. However, it should be appreciated that the child safety seat 10 may be secured in the rear facing direction or may instead be a belt-positioning booster seat. In the forward-facing position, the child safety seat 10 rests on the seat cushion 13 and seat back 15 of the passenger seat 12.

Figure 1B:
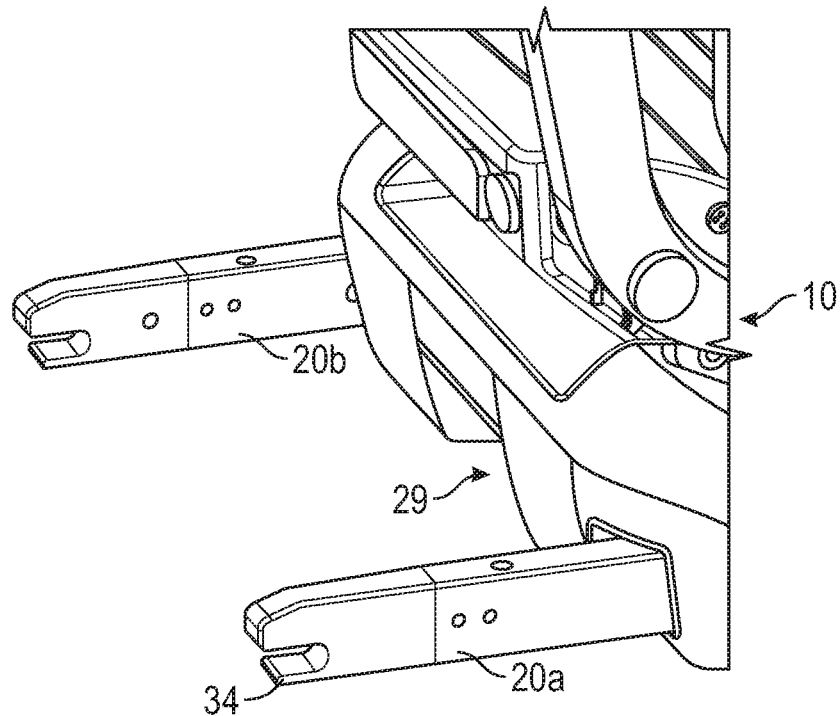
FIG. 1B illustrates rigid arms used to strap a child safety seat according to an exemplary embodiment.

The LATCH system 11 includes two lower anchors 16 (only one is illustrated), which are located near the intersection of the seat cushion 13 and the seat back 15 of the passenger seat 12, and an upper anchor 18 located behind the passenger seat 12. One or more ties 20 are provided to connect the child safety seat 10 to the lower anchors 16. As illustrated, a tie 20 is connected to each side 22 of the child safety seat 10 and is in the form of a flexible strap. In alternative aspects, a single tie 20 may be passed through a tie routing path 24 provided in the child safety seat 10, an aspect of which is illustrated in FIG. 1A, or the tie 20 is otherwise affixed to the child safety seat 10. In further alternative aspects, the ties 20 are in the form of a rigid arms 20a, 20b as illustrated in FIG. 1B, which extend from the base 29 of the child safety seat 10. Child safety seats 10, including those illustrated in FIG. 1A and FIG. 1B, also include a tether 26 as illustrated in FIG. 1A. The tether 26 connects the upper portion of the child safety seat 10 to the upper anchor 18. It should be appreciated that, in aspects, the ties 20 and tether 26 are formed from a flexible material upon which tension is applied by, e.g., threading the ties 20 or tether 26 through a buckle (not illustrated), gripping mechanism or otherwise securing the ties 20 or tether 26 to itself. Tension may also be applied using, e.g., an elastic member such as a spring. Alternatively, as noted above, the ties 20, or tether 26, is formed from a rigid material.

In aspects where the child safety seat 10 is positioned in the rear facing position (not illustrated), the lower anchors 16 are used to secure the child safety seat 10 into the passenger seat 12. The tether 26 and upper anchor 18 may also be used in the rear facing position. In alternative aspects, such as when a child safety seat 10 is a child restraint seat in the forward-facing position or when the child safety seat 10 is a belt-positioning booster seat with a back, the child safety seat 10 may be secured to the passenger seat 12 using the seatbelt 28 associated with the passenger seat (see FIG. 4) alone, or in combination with either the ties 20, tether 26, or both the ties 20 and tether 26 of the LATCH system 11. In yet another alternative aspect, such as when the child safety seat 10 is a belt-positioning booster seat without a back, the child safety seat 10 may be secured to the passenger seat 12 using the seatbelt 28 associated with the passenger seat (see FIG. 4) alone, or in combination with either the tie(s) 20, of the LATCH system 11. Note in case of the booster seat configurations, using the seat belt to attach the booster seat to the vehicle would also attach a child, if present, to the vehicle.

As previously noted, the lower anchor ties 20a, 20b are rigid in aspects, such as the aspect illustrated in FIG. 1B, and do not move or change in shape. In alternative aspects, the lower anchor ties 20 are flexible and may either move or change in shape. Similarly, in aspects, the upper anchor tether 26 is flexible. Alternatively, it is contemplated that the upper anchor tether 26 is rigid and does not move or change in shape. It should be appreciated that all rigid, all flexible, or combinations of all rigid and all flexible lower anchor ties 20a, 20b and upper anchor tethers 26 may be used. For example, rigid lower anchor ties 20a and 20b may be used in combination with a flexible upper anchor tether 26, or flexible lower anchor ties 20 may be used in combination with a rigid upper anchor tether 26.

Figure 2A:
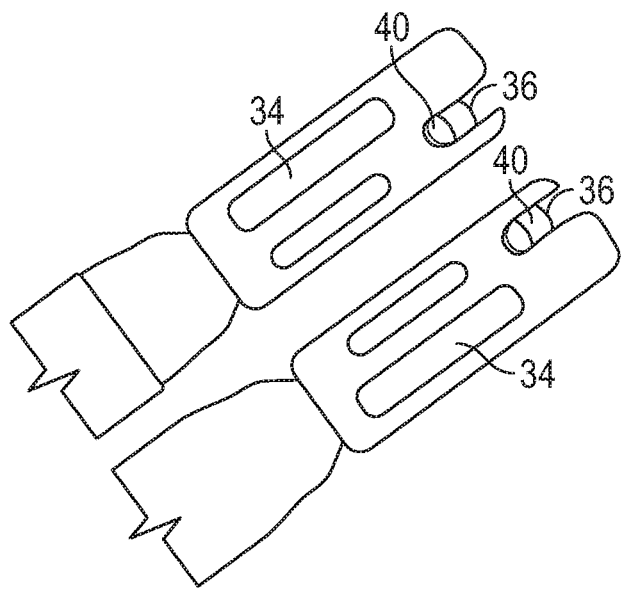
FIG. 2A illustrates an example of a connector style for a child safety seat connector according to an exemplary embodiment.
Figure 2B:
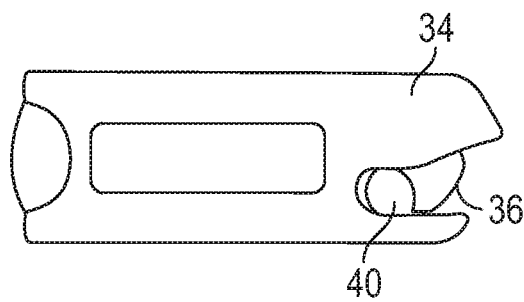
FIG. 2B illustrates an example of a connector style for a child safety seat connector according to an exemplary embodiment.
Figure 2C:
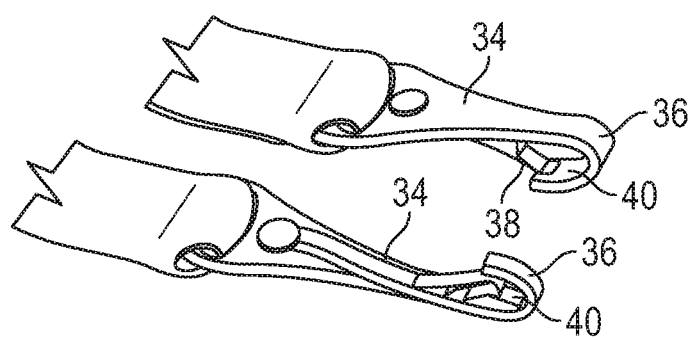
FIG. 2C illustrates an example of a connector style for a child safety seat connector according to an exemplary embodiment.
Figure 3:
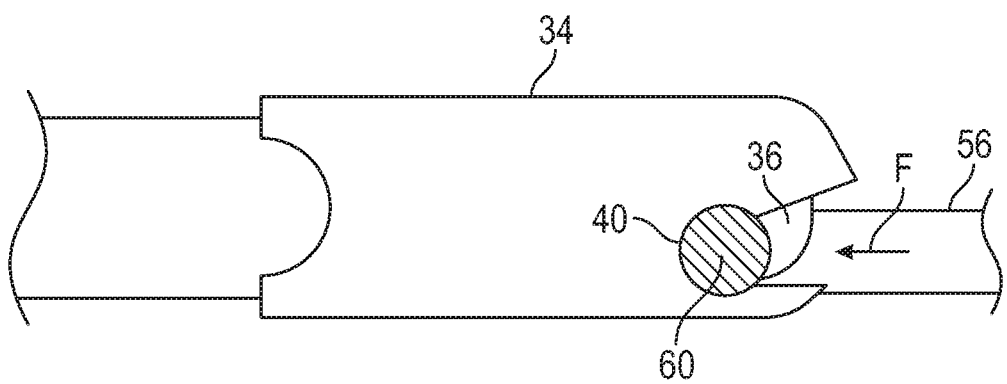
FIG. 3 illustrates a child safety seat connector coupled to an anchor attachment loop of an anchor according to an exemplary embodiment.

The ties 20 and tether 26 of a child safety seat 10 are connected to the lower anchors 16 and upper anchors 18 using child safety seat connectors 34, which are affixed to the ties 20 and the tether 26. FIGS. 2A, 2B and 2C illustrate various aspects of the child safety seat connectors 34. Each child safety seat connector 34 includes a hook 36. The variants in FIGS. 2A and 2B have a moving hook that are actuated with a button (not shown) and the variant illustrated in FIG. 2C includes a biased closure 38, which closes the child safety seat connector 34 around the lower anchors 16 or upper anchor 18 to secure a tie 20 or tether 26, respectively. In addition, a child safety seat connector 34 defines an opening 40 in which the anchor attachment loop bar 60 of either the lower anchor 16 or upper anchor 18 is received, as illustrated in FIG. 3 and described further below.

Referring again to FIG. 1A, anchor attachment detection sensors 30a, 30b (collectively referred to as anchor attachment detection sensors 30) are provided for at least one anchor 16, 18 associated with a given passenger seat 12. FIG. 1A illustrates a lower anchor attachment detection sensor 30a associated with each lower anchor 16 and an upper anchor attachment detection sensor 30b associated with the upper anchor 18. When the ties 20 are connected to the lower anchors 16a, 16b, each lower anchor attachment detection sensor 30a transmits a control signal to a microprocessor control system (MCS) 32 indicating the ties 20 have been connected to each of the lower anchors 16a, 16b. Similarly, when the tether 26 is connected to the upper anchor 18, the upper anchor attachment detection sensor 30b transmits a control signal to the microprocessor control system 32 indicating the tether 26 has been connected to the upper anchor 18. Each anchor attachment detection sensor 30 detects an interaction with the corresponding lower anchor 16 or upper anchor 18. The interaction indicates 1) the connecting of a child safety seat connector 34 to the lower anchor 16 or upper anchor 18, 2) the insertion of a foreign object into the anchor, as discussed further below, or 3) that nothing is attached to the anchor 16, 18.

The microprocessor control system 32 includes and is configured to execute a control algorithm, wherein the microprocessor control system 32 receives the control signals from the anchor attachment detection sensors 30 and is configured to execute the control algorithm to determine whether the child safety seat connectors 34 for the ties 20, tether 26, or both the ties 20 and tether 26 are connected to the lower anchors 16 and upper anchor 18. In further aspects, the microprocessor control system 32 includes and is configured to execute a control algorithm that, from the control signals received from the anchor attachment detection sensors 30, and optionally one or more external sensors, such as a camera, a RADAR, an in-seat pressure sensor, an in-seat weight sensor, determines the type of child safety seat or child safety seat connector 34 connecting the ties 20 or tether 26 to the lower anchors 16 or the upper anchors 18, respectively. The microprocessor control system 32, in aspects, includes one or more processors and memory modules for storing and implementing the control algorithm. The microprocessor control system 32 is coupled to the sensors through electrical wires, optical pathways, or wireless interfaces provided in the anchor attachment detection sensors 30 and microprocessor control system 32, which are represented in FIG. 1A as wires 104a, 104b.

In additional aspects, the microprocessor control system 32 optionally includes a control algorithm that receives the control signals from the anchor attachment detection sensors 30 of the lower anchors 16 and determines whether the ties 20 are rigid, as illustrated in FIG. 1B, or flexible, as illustrated in FIG. 1A, by measuring a lapsed time period between an interaction of a tie 20 with a first lower anchor 16 and the interaction the tie 20 (or of a second tie 20) to a second lower anchor 16. If the interactions detected by the lower anchor attachment detection sensors 30 occur simultaneously or within less than a few seconds, such as less than 10 seconds, or less than 5 seconds, or less than 2 seconds, the microprocessor control system 32 determines the ties 20 are rigid ties. If it takes more than a few seconds, such as more than 10 seconds, between interactions with the first lower anchor 16 and the second lower anchor 16, the microprocessor control system 32 determines that the ties 20 are flexible.

Referring again to FIG. 1A, while a forward-facing infant or convertible child safety seat 10 is illustrated, the child safety seat 10 can be forward-facing, rear-facing or both forward- and rear-facing. Such seats also include their own safety harness, such as three point or five-point harnesses, for retaining the child within the child safety seat 10, often referred to as child restraint seats. In addition, the child safety seat 10 may alternatively be a belt-positioning booster seat or a variation thereof, which usage depends on at least one of the age, weight, and height of the child. Child safety seats 10, in further aspects, may also include transverse child beds allowing for a child to lay down, typically laterally across the vehicle seat. It should, therefore, be appreciated that depending on the configuration of the child safety seat 10, user preference, and installation guidelines predicated by the manufacturer and automaker, one or more of the lower anchors 16, upper anchor 18, and seatbelt 28 (see FIG. 4), may be used to secure the child safety seat 10 to the passenger seat 12.

Figure 4:
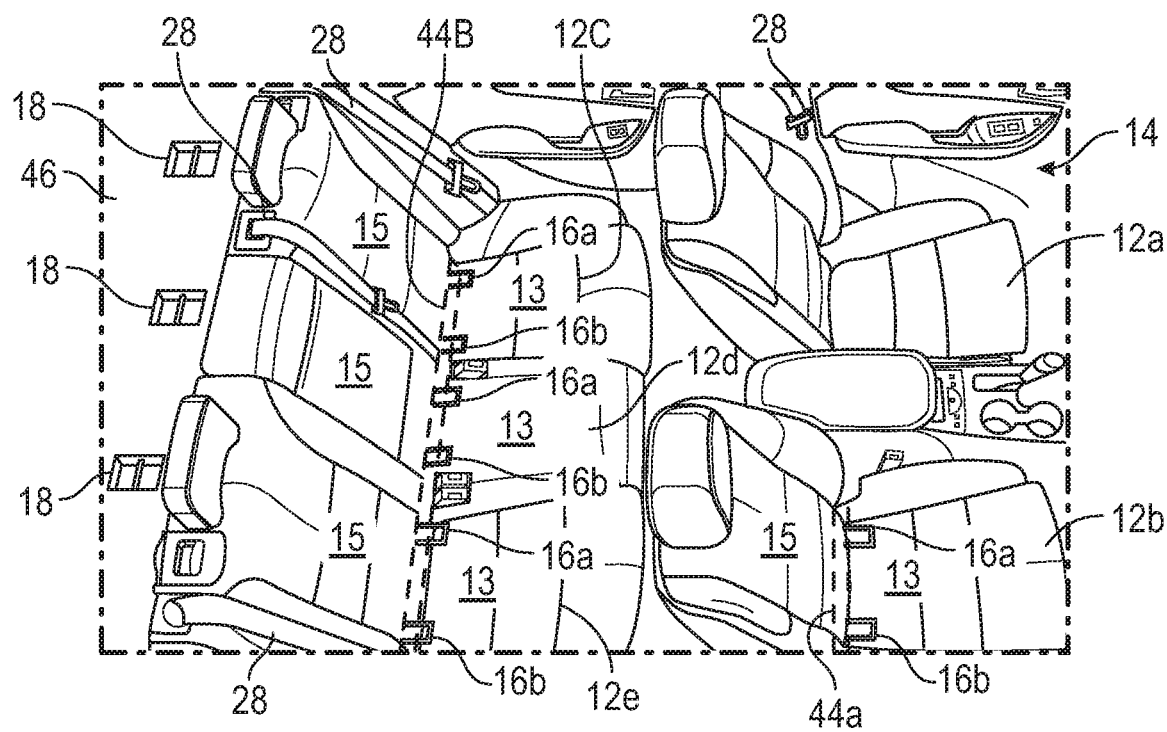
FIG. 4 illustrates a vehicle interior including passenger seats according to an exemplary embodiment.

FIG. 4 illustrates the positioning of lower anchors 16a, 16b and upper anchors 18 in a vehicle interior 14. The passenger seats 12a, 12b, 12c, 12d, 12e include a first passenger seat (often referred to as a driver's seat) 12a, a second front passenger seat 12b, and three rear passenger seats 12c, 12d, 12e. Associated with each passenger seat 12 is a seatbelt 28. In the aspect illustrated, a set of lower anchors 16a, 16b are associated with the passenger seats 12c, 12d, 12e. A set of lower anchors 16a, 16b may also be associated with the front passenger seat 12b, as illustrated, and, in additional aspects not illustrated, the passenger seat 12a. The lower anchors 16a, 16b are connected to a cross member 44, such as a crossbeam 44a, that forms a part of the vehicle frame, or a cross bar 44b that is integrated into a passenger seat 12b. Further, an upper anchor 18 is associated with each rear passenger seat 12c, 12d, 12e and located in the rear deck 46. An upper anchor 18 may also be associated with the front passenger seat 12b and placed at either in the rear 48 (see FIG. 1A) of the passenger seat 12 or integrated into the vehicle roof or floor. Similarly, if the rear passenger seats 12c, 12d, 12e are captains' chairs or if the rear deck 46 is not present, the upper anchor 18 may be placed at either the rear 48 of the passenger seats 12c, 12d, 12e, integrated into the roof, in the floor, or in other body structure (not illustrated). It should be further appreciated that, while FIG. 4 does not include lower anchors 16 and upper anchor 18 in passenger (driver) seat 12a, lower anchors 16 and an upper anchor 18 may be included in the passenger seat 12a. Further, while lower anchors 16 and upper anchors 18 are included in passenger seats 12b, 12c, 12d, 12e, lower anchors 16 and upper anchors 18 may be omitted in any of the passenger seats 12b, 12c, 12d, 12e, and are often omitted in passenger seat 12d.

Figure 5:
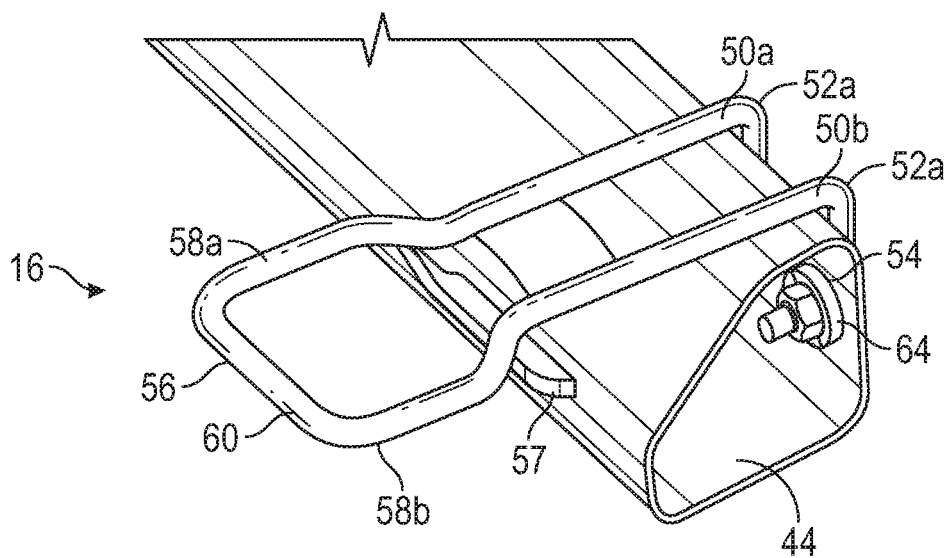
FIG. 5 illustrates an anchor affixed to a cross member in a vehicle according to an exemplary embodiment.

Turning now to FIG. 5, an aspect of a lower anchor 16 is illustrated. The lower anchor 16 includes two anchor legs 50a, 50b (collectively referred to as anchor legs 50), which form T hooks 52a, 52b (collectively referred to as hooks 52) that extend from either side of the lower anchor 16. The hooks 52a, 52b are inserted into openings 54 (only one opening is illustrated) in the cross member 44. In the illustrated aspect, opposing the hooks 52a, 52b is an anchor attachment loop 56, which is accessible to passengers and to which the child safety seat 10 is coupled to. In additional, or alternative aspects, the anchor attachment loop 56 is attached to the cross member 44 by attachment bracket 57. The attachment bracket 57 is configured as a bracket welded to the anchor attachment loop 56 and the cross member 44 or otherwise mechanically attached to the cross member 44, and anchor attachment loop 56. In aspects, the anchor attachment loop 56 includes two anchor attachment loop side arms 58a, 58b (collectively 58) and an anchor attachment loop bar 60 extending between the anchor attachment loop side arms 58a, 58b. The anchor attachment loop bar 60 is received within the opening 40 defined by the child safety seat connector 34 as illustrated in FIG. 3. In other aspects, the anchor attachment loop 56 assumes other configurations, such as a circle or a rectangle.

In the illustrated aspect, the anchor legs 50a, 50b extend from the anchor attachment loop 56 and are optionally welded, or otherwise fastened together between the "j" hooks 52a, 52b. Further, the anchor attachment loop 56 includes an optional bridge 62 between the anchor legs 50a, 50b. In additional aspects, the lower anchor 16 is welded, or otherwise fastened by a mechanical fastener 64, to the cross member 44. The lower anchors 16 are stationary and do not pivot or rotate relative to the cross member 44.

It should be appreciated that, the upper anchor 18 also includes an anchor attachment loop 56, which is received in the opening 40 of a child safety seat connector 34. In aspects, the upper anchor 18 exhibits the same features as the lower anchors 16. Alternatively, the anchor attachment loop 56 of the upper anchor 18 may consist of just the anchor attachment loop bar 60 or may include only the anchor attachment loop bar 60 and the anchor attachment loop side arms 58. Like the lower anchor 16, the upper anchor 18 is affixed directly to a structural member (not illustrated) in the rear deck 46, in the floor, in the ceiling, in the rear of a passenger seat 12, or to structure in another location in front of or behind the passenger seat 12 with which it is associated.

Figure 6A:
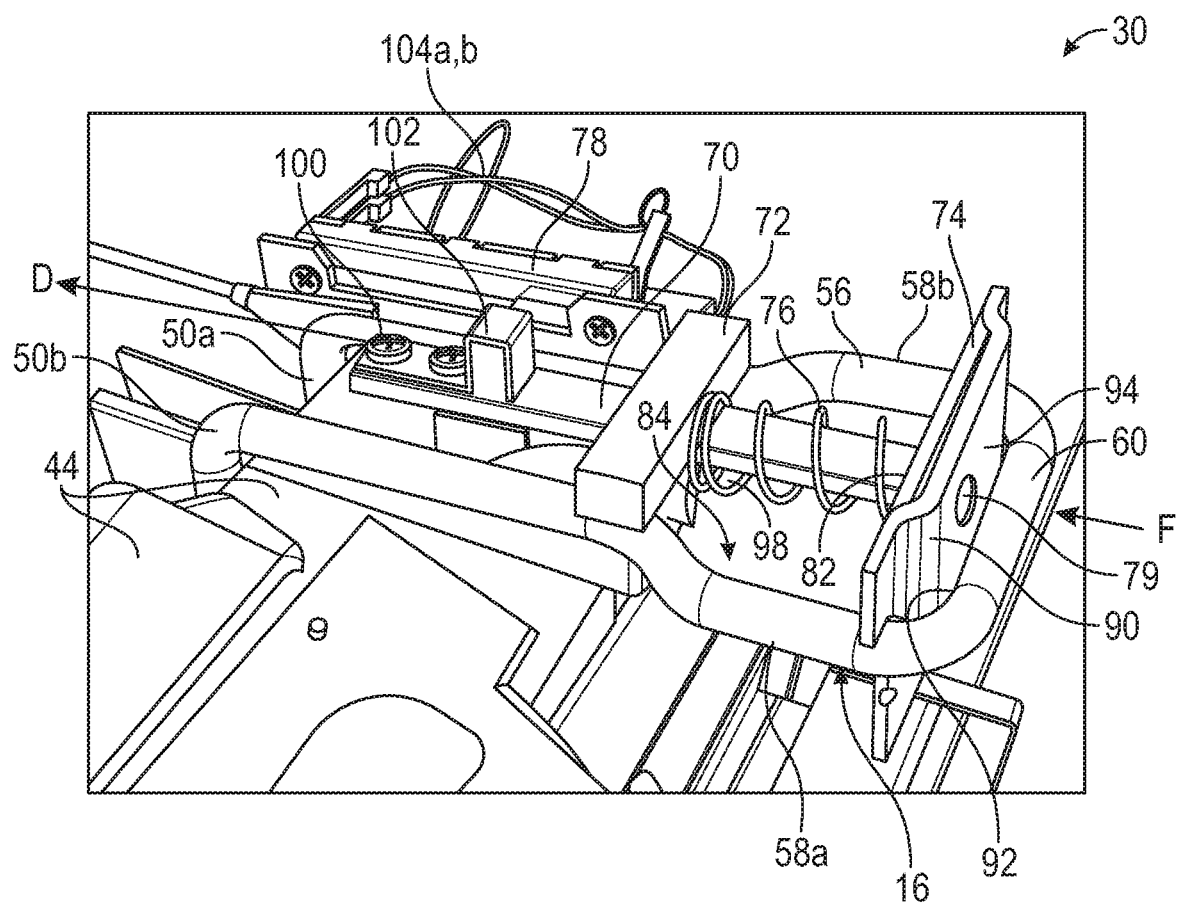
FIG. 6A illustrates another aspect of an anchor attachment detection sensor according to an exemplary embodiment.
Figure 6B:
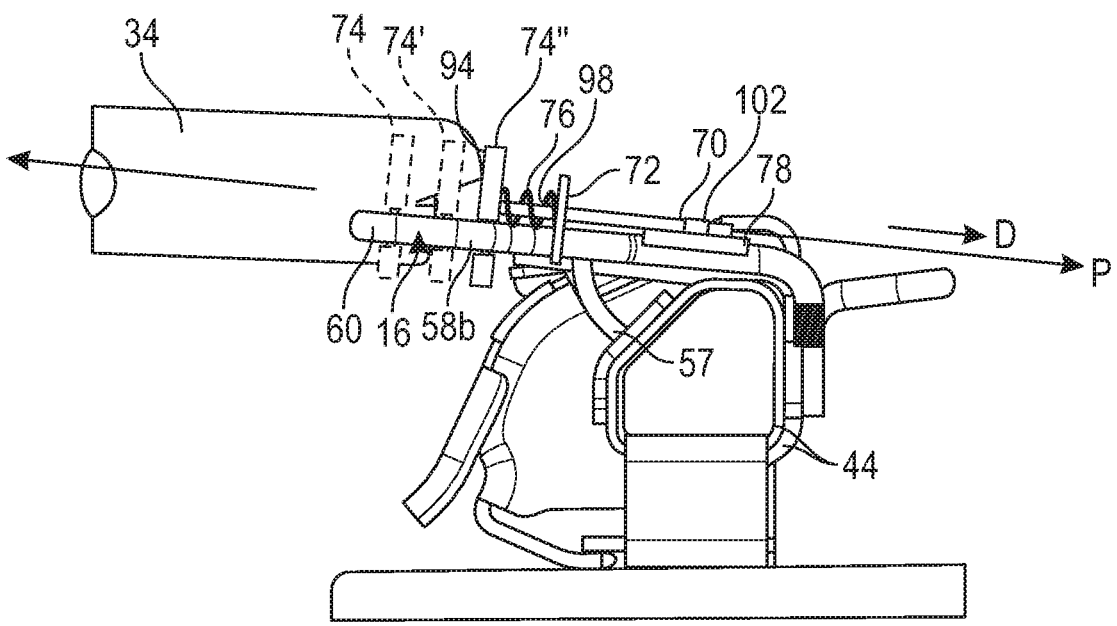
FIG. 6B illustrates the attachment detection of FIG. 6A according to an exemplary embodiment.

FIG. 6A and FIG. 6B illustrate an aspect of an anchor attachment detection sensor 30 supported by a lower anchor 16. It should be appreciated that the description herein applies to lower anchors 16 and lower anchor attachment detection sensors 30a as well as the upper anchor 18 and the upper anchor attachment detection sensors 30b; however, for convenience, reference is made further herein to the lower anchor 16 and to an anchor attachment detection sensor 30. The anchor attachment detection sensor 30 includes a slide 70, a slide mount 72, a plate 74 carried by the slide, a spring 76 that biases the plate 74 against the anchor attachment loop bar 60, and a sensing device 78 associated with the slide 70, configured to detect a location of the plate 74 and slide 70 relative to the anchor attachment loop bar 60, or linear displacement, of the plate 74 and slide 70.

When a child safety seat connector 34 is coupled to the anchor 16, the child safety seat connector 34 applies a force F against the plate 74 and slide 70, pushing the slide 70 and plate 74 away from the anchor attachment loop bar 60 as illustrated by plate 74', 74". For reference, plate 74 is the plate location when biased against the anchor attachment loop bar 60 when a child safety seat connector 34 is not attached and nothing is present between the anchor attachment loop bar 60 and the plate 74. The sensing device 78 detects the displacement of the slide 70 (and plate 74). In aspects, the sensing device 78 is selected so as to detect an interaction with the anchor, such as displacement of the slide 70 and plate 74', 74" relative a fixed point, such as the anchor attachment loop bar 60 or other fixed point and the change in distance relative to the fixed point. The displacement is a linear displacement in direction D (see FIGS. 6A and 6B) parallel to plane P. In aspects, the degree of displacement informs the microprocessor control system 32 of the type of child safety seat connector 34 being used.

In aspects, the anchor attachment detection sensor 30 is mounted onto and, in aspects, is fully supported by the lower anchor 16. That is, it is not necessary to secure the anchor attachment detection sensor 30 to other structures associated with the passenger seat 12, other than the wires 104a, 104b (see also FIGS. 1 and 6, herein after referred to as wires 104a) that carry signals to the microprocessor control system 32, and in aspects, the anchor attachment detection sensor 30 is not supported by any other structures associated with the passenger seat 12. However, as described further herein, in alternative aspects, the anchor attachment detection sensor 30 may be mounted to other structures associated with the vehicle frame or passenger seat 12, such as a bezel 45 or cross member 44.

With further reference to FIGS. 6A and 6B, the slide 70 is mounted aft of the anchor attachment loop bar 60 relative to the child safety seat 10. As referred to herein, "aft" may be understood as being positioned to the rear of the vehicle or behind the anchor attachment loop bar 60 relative to direction D. The slide 70 is held in place by the slide mount 72, which is affixed to the anchor 60 in the aspect illustrated. In aspects, and with reference to FIG. 7A, the slide mount 72 defines an opening 80 in which the slide 70 is positioned. The slide 70 moves through the opening 80 back and forth relative to the anchor attachment loop bar 60 in a plane P, or in a plane parallel to a plane P as shown in FIG. 6b, defined by the anchor attachment loop 56. In aspects, the slide 70 may also be supported by the sensing device 78 or by the plate 74.

Figure 7A:
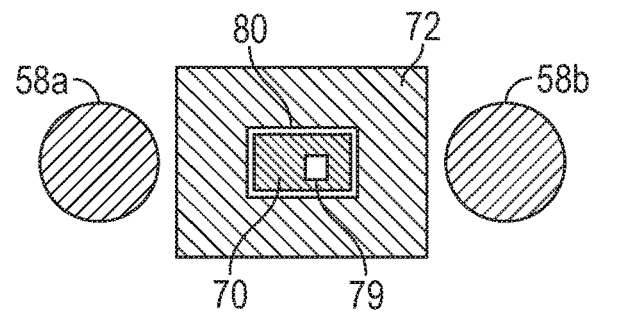
FIG. 7A is cross-section of FIG. 6B, aft of the plate according to an exemplary embodiment.
Figure 7B:
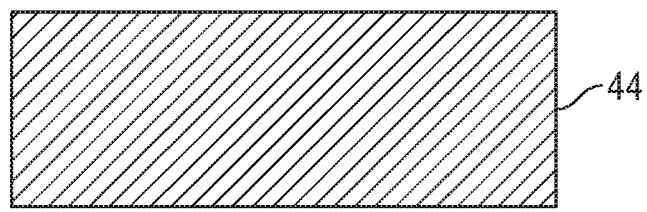
FIG. 7B is cross-section of an anchor, wherein the anchor attachment detection sensor is affixed to the vehicle seat structure according to an exemplary embodiment.
Figure 7C:
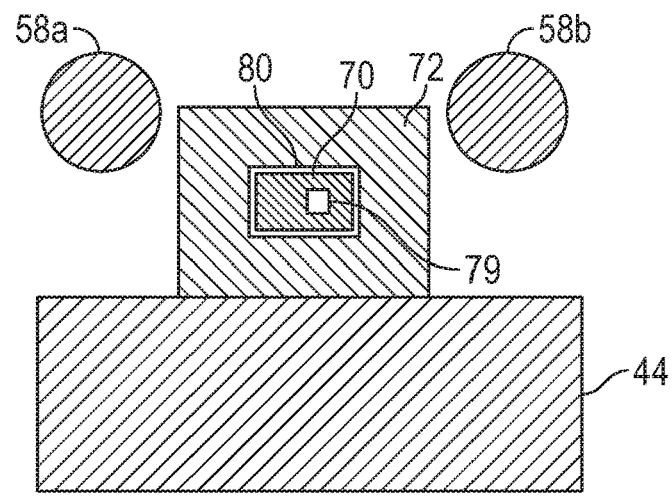
FIG. 7C is cross-section of an anchor, wherein the anchor attachment detection sensor is affixed to a bezel surrounding the anchor according to an exemplary embodiment.

Reference is now made to FIG. 7A, which illustrates the slide mount 72 between anchor attachment loop side arms 58a, 58b. The slide mount 72 may be attached to anchor attachment loop side arms 58a, 58b or other nearby structure (as illustrated in FIGS. 7B and 7C). In such an arrangement, the slide 70 travels in a plane that is parallel to and at the same height as the plane P defined by the anchor attachment loop 56. Reference is now made to FIG. 7B, which illustrates the slide mount 72 affixed to the cross member 44. In such an arrangement, the slide 70 travels in a plane that is parallel to, yet below, the plane P defined by the anchor attachment loop 56. FIG. 7C illustrates yet another aspect, wherein the slide mount 72 is affixed to a bezel 45. The bezel 45 surrounds the anchor attachment loop 56 and is coupled, in aspects, to a cross member 44 or other structure associated with the passenger seat 12 or vehicle frame.

Figure 8A:
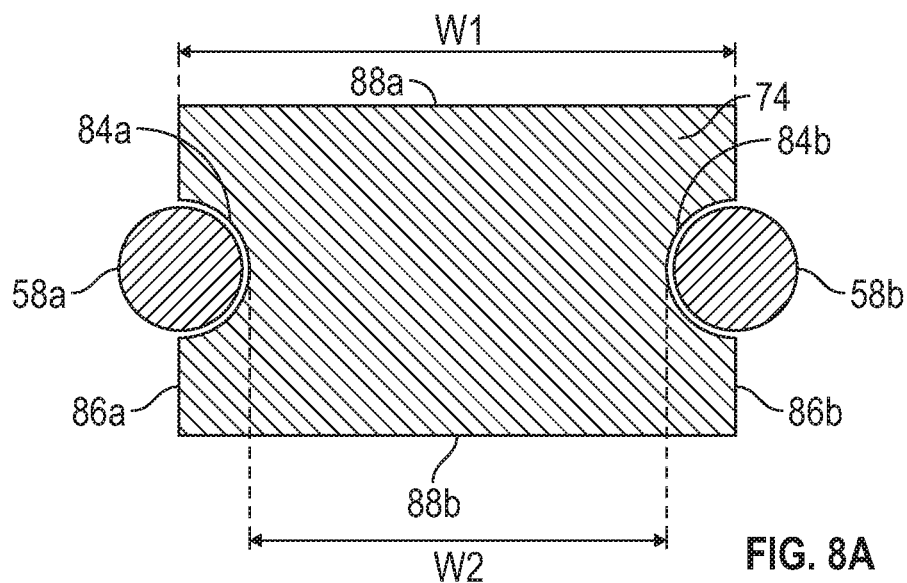
FIG. 8A illustrates positioning of the plate relative to the anchor attachment loop according to an exemplary embodiment.
Figure 8B:
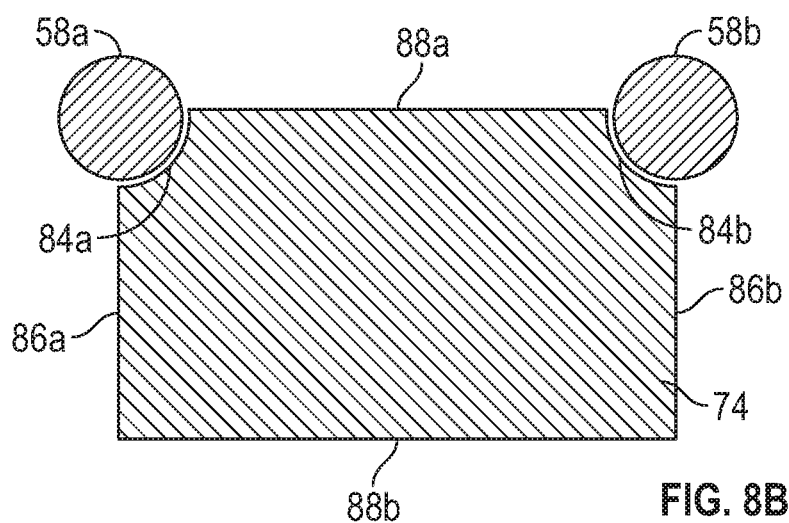
FIG. 8B illustrates positioning of the plate relative to the anchor attachment loop according to an exemplary embodiment.
Figure 8C:
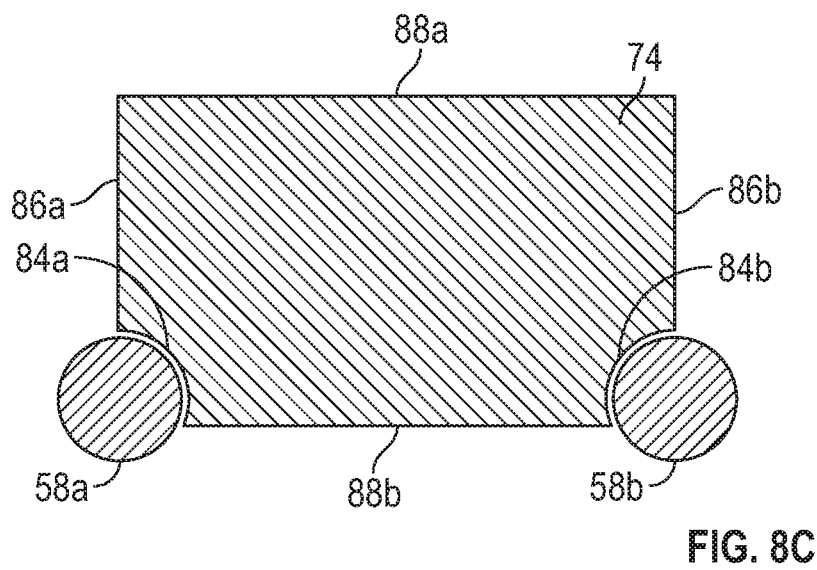
FIG. 8C illustrates positioning of the plate relative to the anchor attachment loop according to an exemplary embodiment.

Referring again to FIG. 6A in addition to FIGS. 7A through 7C, plate 74 is mounted on a first end 82 of the slide 70. Plate 74 contains lateral edges 86a, 86b and longitudinal edges 88a, 88b as illustrated, in FIG. 8A. The plate 74 exhibits a first width W1 that is wider than the width W2 defined between the anchor attachment loop side arms 58. To accommodate the anchor attachment loop side arms 58, the plate 74 defines recesses 84a, 84b (hereinafter recesses 84) at either lateral edge 86a, 86b (hereinafter lateral edges 86) of the plate 74 that receive the anchor attachment loop side arms 58 and slidably interface with the two anchor attachment loop side arms 58. As illustrated in FIG. 8A the recesses 84 are generally positioned between the upper longitudinal edge 88a and the lower longitudinal edge 88b. In alternative embodiments, the positioning of the plate may move up or down, depending on which structure the slide mount 72 is affixed to, as illustrated in FIGS. 8B and 8C. FIG. 8B illustrates an example wherein, as illustrated in FIG. 7B, the slide mount 72 is affixed to a cross member 44 below the anchor attachment loop 56, positioning the slide 70 below the anchor attachment loop 56. In this example, the plate 74 is positioned relatively low and includes openings defined in the corners of upper longitudinal edge 88a and lateral edges 86. FIG. 8C illustrates an example wherein, as illustrated in FIG. 7C, the slide mount 72 is affixed to a bezel 45 above the anchor attachment loop 56, positioning the slide 70 above the anchor attachment loop 56. In this example, the plate 74 is positioned relatively high and includes openings defined in the corners of lower longitudinal edge 88b and lateral edges 86.

Due to the recesses 84 the plate 74 is slidable over the anchor attachment loop side arms 58 and, in further aspects, the plate rides on, and is supported by, the anchor attachment loop side arms 58. It should be appreciated that allowing the plate 74 to ride over the anchor attachment loop side arms 58 prevents the slide 70 and plate 74 from pivoting or misaligning with the slide mount 72 which may distort sensor measurements. It should also be appreciated that the plate 74 can be configured so that it does not interact with anchor attachment loop side arms 58 if, for example, opening 80 is structurally sufficient to prevent slide 70 misalignment as slide 70 moves through opening 80.

Referring again to FIGS. 6A and 6B, in the illustrated aspect, the front face 90 of the plate 74 is curved congruous to the interior face 92 of the anchor attachment loop bar 60. In aspects, the curvature of the front face 90 reduces gaps between the front face 90 of the plate 74 and the interior face 92 of the anchor attachment loop bar 60. In alternative aspects, the front face 90 of the plate 74 may be flat, without curvature. In aspects, the front face 90 of the plate 74 includes a vibration isolation material, including, e.g., cork, felt and synthetic rubber such as neoprene, nitrile, polyisoprene rubber, and polyurethane. In aspects, the vibration isolation material 94 is adhered to the plate 74 using an adhesive, such as a hot melt or pressure sensitive adhesive.

It may also be heat staked or otherwise mechanically attached. A vibration isolation material may be understood as a material that reduces or mitigates the transfer of vibrations between the plate 74 and items contacting the front face 90 of the plate 74.

A spring 76 is placed between the slide mount 72 and the plate 74, biasing the plate 74 against the anchor attachment loop bar 60. While a helical spring is illustrated, the spring 76 may assume alternative configurations, such as volute spring, a clockspring coil spring (similar to what is used in a seat belt retractor) or a leaf spring if enough travel can be obtained. In the aspect illustrated, the spring 76 defines a tunnel 98 in which the slide 70 is received and through which the slide 70 passes. However, the spring 76 may be located adjacent to the slide 70, or additional springs (not illustrated) may be provided on either side of the slide 70. In another aspect spring 76 may connect either the plate 74 or slide 70 (which is attached to plate 74) to a portion of the mounting structure for the anchor attachment loop bar 60.

As noted above, a sensing device 78 is associated with the slide 70 and is configured to measure an interaction with the anchor attachment sensor 30. In aspects, the sensing device 78 is configured to measure travel of the slide 70 relative to the anchor attachment bar loop bar 60. In the aspect illustrated, the sensing device 78 is affixed adjacent to the slide 70 near the second end 100 of the slide 70 opposing the first end 82. Further, the slide 70 includes an attached sensible element 102 or, alternatively, the sensible element 102 is integrally formed in the slide 70 allowing the slide travel to be sensed by the sensing device 78. Travel of the slide 70 displaces the sensible element 102, which alters the control signals generated by the sensing device 78 of the anchor attachment sensor 30 and provided to the microprocessor control system 32. In other aspects, the sensing device 78 is affixed directly to the slide 70 such as where sensible element 102 is located and movement of the slide 70 relative to the stationary surrounding structure, such as the anchor attachment bar 60, alters the control signals generated by the sensing device 78. A sensible element 102 can optionally be attached to stationary surrounding structure in this aspect.

In aspects, such as where the sensible element 102 is a ferromagnetic sensible element 102 and is formed from a ferromagnetic metallic material, the sensing device 78 is a metallic proximity sensor, such as a capacitive displacement sensor, Hall Effect sensor, inductive proximity sensor, eddy current sensor, or magnetic sensor. In additional aspects, the sensing device 78 includes a radar sensor, an ultrasonic sensor, an optical sensor, such as a photoelectric sensor, a photocell, a charged couple sensor, a passive thermal infrared sensor, a radar sensor, or an LED sensor where it can pick up the physical location of the sensible element 102. In yet additional aspects, the sensing device 78 is at least one of a contact type sensor, such as a strain gauge, a spring gauge, pressure sensor, mechanical switch or piezo electric sensor where the sensing device physically interacts with the sensible element 102. In further aspects, the sensing device 78 includes a linear potentiometer such as a linear variable displacement sensor, a linear variable differential transformer, or a linear encoder. As illustrated, the sensing device 78 is affixed to one of the anchor legs 50b. In other embodiments, the sensing device 78 is affixed to the slide 70, a bezel 45, or a cross member 44 or other structure associated with the vehicle.

In aspects, additional sensing devices may be included. In one additional aspect, the additional sensing device 79 is a force sensor mounted to the front face 90 of the plate 74 for measuring changes in force applied to the plate 74. The force sensor includes one or more of the following, a strain gauge load cell, a piezoelectric crystal, hydraulic load cell, pneumatic load cell, or other devices.

Figure 9A:
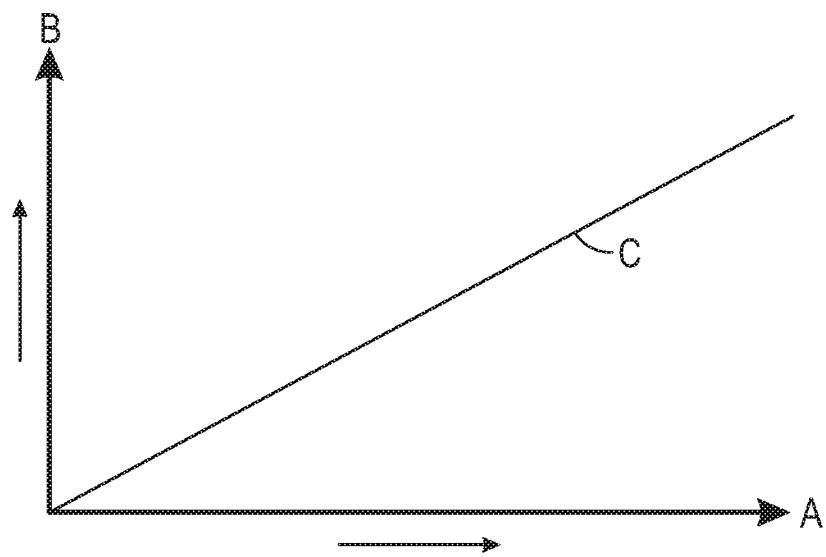
FIG. 9A illustrates a graph of control signal value B versus distance A of the plate relative to the anchor attachment loop according to an exemplary embodiment.

When the child safety seat connector 34 is coupled to the anchor attachment loop 56, it presses against the plate 74 in direction D forcing the plate 74 and the slide 70 back in direction D, which causes variation of the control signal value. For example, in aspects the control signal values, which may be represented by e.g., voltage, current, resistance (ohm), time delay, frequency, etc., increase the further the plate 74 is pushed away from the anchor attachment loop bar 60 in direction D. FIG. 9A illustrates an example of an increase in control signal value (Axis B) and distance traveled (Axis A) upon pushing the plate 74 back and away from the anchor attachment loop bar 60. While the relationship, represented by line C, is illustrated as a mathematically linear relationship between distance on Axis A and control signal value on Axis B (wherein the values of distance and control signal increase as the axes depart from the origin), the relationship between distance and control signal value may exhibit other mathematical functions depending on the type of sensing device selected. Further, while an increasing relationship is illustrated, an inverse relationship may be exhibited, wherein the control signal value may be reduced with an increase in distance of the plate 74 and slide 70 from the anchor attachment loop bar 60.

In aspects, predetermined threshold control signal values or value ranges are set for various positions of the plate 74 relative to the anchor attachment loop bar 60. For example, an installation threshold control signal value may be set, wherein above this value the microprocessor control system 32 determines that a child safety seat connector 34 is coupled to an anchor attachment loop bar 60 or a foreign object is present and forcing the plate 74 away from the anchor attachment loop bar 60. In another example, when the control signal values occur within a given predetermined range, the microprocessor control system 32 determines that either 1) the plate 74 is positioned against the anchor attachment loop bar 60; or 2) the plate 74 is located in a position correlated to the connection of a child safety seat connector 34 to the anchor attachment loop 56.

Figure 9B:
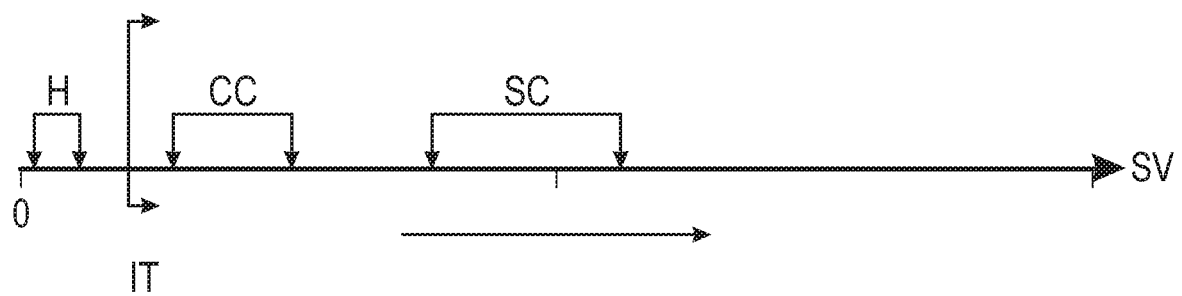
FIG. 9B illustrates a representation of increasing control signal value SV, or distance of the plate relative to the anchor attachment loop, and the relative value or location of predetermine control signal ranges according to an exemplary embodiment.
Figure 10:
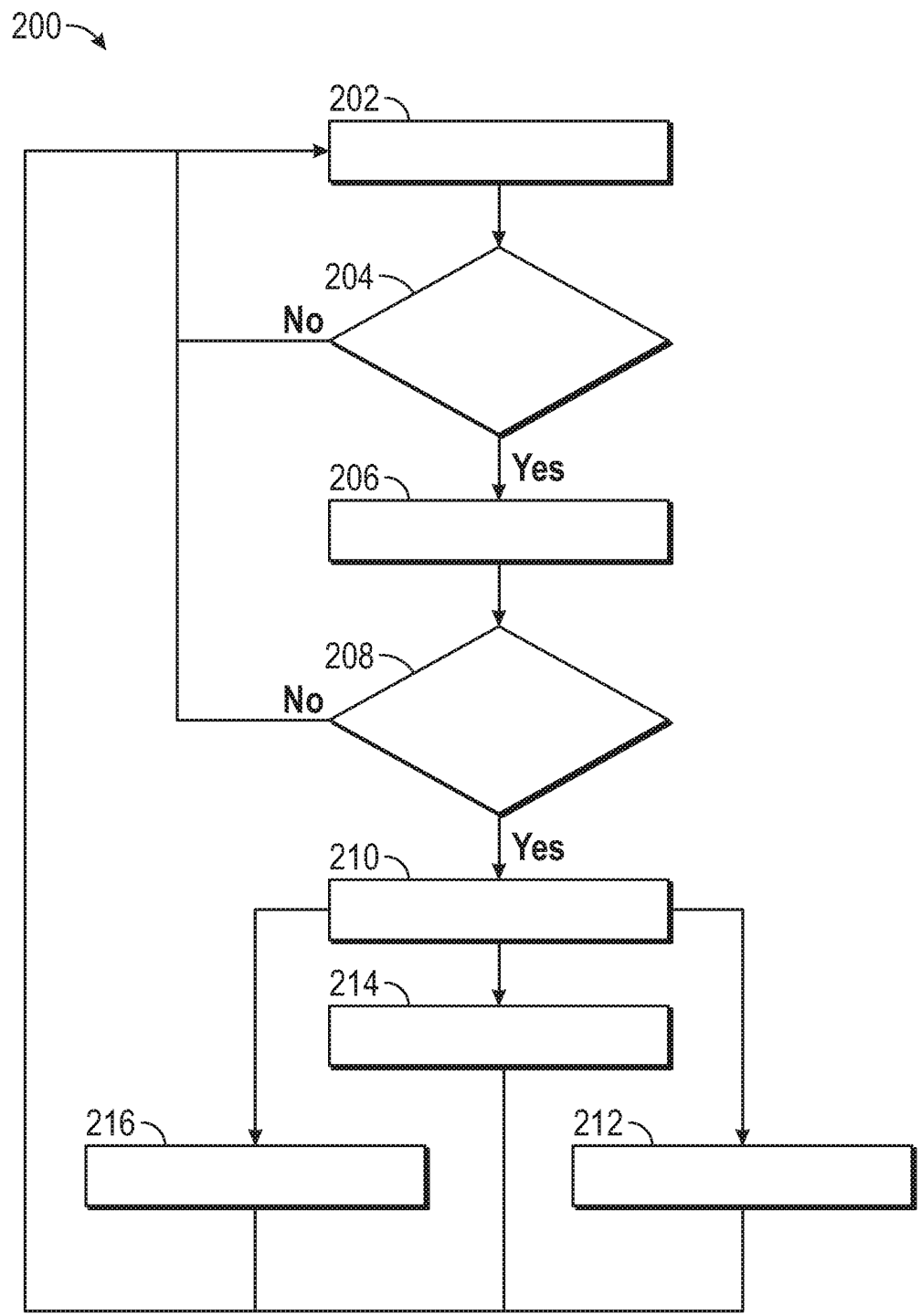
FIG. 10 illustrates a method of detecting anchor attachment according to an exemplary embodiment.

FIG. 9B illustrates a chart of increasing control signal value (SV), which correlates to an increasing distance from the anchor attachment loop bar 60. A first predetermined control signal range, indicated on the line as "Home" H, represents the situation where the front face 90 of the plate 74 is positioned against the anchor attachment loop bar 60, when a child safety seat connector 34 or foreign object is not present. When the microprocessor control system 32 receives a control signal and identifies that the control signal value is within this range, the microprocessor control system 32 indicates that the plate 74 is positioned against to the anchor attachment loop bar 60 without a child safety seat connector 34 coupled to the anchor 16.

As the plate 74 is pushed away from the anchor attachment bar loop bar 60, in the illustrated diagram, the control signal increases and may cross an "Installation Threshold" IT, as described above. When the microprocessor control system 32 receives a control signal value within the range indicated as "First Connector Style CC" CC, the microprocessor control system 32 indicates that there is a child safety seat connector 34, such as in the form of child safety seat connector 34 illustrated in FIG. 2C, coupled to the anchor 16. When the microprocessor control system 32 receives a control signal value within the range indicated as "Second Connector Style" SC, the microprocessor control system 32 indicates that there is a child safety seat connector 34 in the form of child safety seat connectors 34 illustrated in FIGS. 2A and 2B coupled to the anchor 16.

If the control signal value of the sensing device 78 is greater than the range indicating that the plate 74 is in the "Home" H position adjacent to the anchor attachment loop bar 60 and falls outside of the additional predetermined ranges, such as the ranges noted above indicating a "First Connector Style" CC or a "Second Connector Style" SC is affixed to the anchor attachment loop bar 60, then the microprocessor control system 32 identifies a foreign object is present between the plate 74 and the anchor attachment loop bar 60. The microprocessor control system 32 may then take a ride action associated with the presence of a foreign object in the anchor attachment loop 56 including issuing a warning indicator, such as an auditory indicator, visual indicator, haptic indicator, or a combination of these indicators; performing a ride action, such as stopping a ride in progress or not initiating a ride; or both issuing a warning indicator and performing a ride action.

While only three control signal value ranges are described above, additional value ranges may be predetermined, such as for a child safety seat connector configuration that is not illustrated in FIGS. 2A through 2C. Further, it should be appreciated that sensor fault conditions may be detected. For example, if the sensing device 78 is configured to provide an increasing control signal value as the slide 70 is moved away from the attachment anchor loop bar 60 and the lower level for indicating the "Home" control signal value is set at a level greater than 0, then the microprocessor control system 32 will always detect a control signal value. With such a configuration, if the sensing device 78 stops functioning and stops transmitting a control signal, the microprocessor control system 32 will detect the control signal value as zero and indicate that the sensing device 78 is malfunctioning. Further, an upper threshold for the control signal value may be set, such as when the slide 70 is forced as far back as possible against the slide mount 72. If the microprocessor control system 32 detects a control signal value greater than this level, the microprocessor control system 32 may indicate that the sensing device 78 is malfunctioning. In addition, if the microprocessor control system 32 detects a control signal value at this level for a certain period of time, the microprocessor control system 32 may indicate that the sensing device 78 is malfunctioning.

Accordingly, a method 200 is provided for herein for detecting, not only the placement of an object, such as a child safety seat connector 34, between the plate 74 and an anchor attachment bar 60 but also for making a determination of the type of child safety seat connector 34 connected to the anchor attachment bar 60 or if a foreign object is placed between the anchor attachment loop bar 60 and plate 74. Beginning at block 202, the plate 74 is determined to be in the "Home" position, i.e., where the plate 74 is positioned against the anchor attachment loop bar 60 and the sensing device 78 is issuing a control signal to the microprocessor control system 32, which the microprocessor control system 32 determines the value to be within the "Home" range.

In the next step at block 204, the microprocessor control system 32 makes a determination as to whether the control signal issued by the sensing device 78 to the microprocessor control system 32 is greater than the Installation Threshold value (SEE FIG. 9B). If it is determined at block 204 that the control signal value is below the "Installation Threshold" IT of any child safety seat connector 34, then a determination is made whether the plate 74 is at the "Home" position. In an additional aspect, if the control signal value is greater than the value of the "Home" range but less than the installation value, a determination may be made that a foreign object is placed between the plate 74 and the anchor attachment loop bar 60.

If the microprocessor control system 32 determines at block 204 that the control signal is greater than the "Installation Threshold" IT, in aspects a determination may be made that a child safety seat connector 34 is coupled to the anchor attachment loop bar 60. However, it is feasible that a foreign object may alternatively be present between the plate 74 and the anchor attachment loop bar 60.

Further, it should be appreciated that upon securing a child safety seat connector 34 to an anchor 16, it may be necessary to secure the child safety seat connector 34 to push the connector 34 in direction D (see FIG. 6B) further away from the anchor attachment loop bar 60 than where the plate 74 rests when the child safety seat connector 34 is secured to the anchor attachment loop bar 60. Thus, a determination of the type of child safety seat connector 34 being used may not be made based on, e.g., the largest control signal value received by the microprocessor control system 32 from the sensing device 78, but rather by a control signal value measured after a given time period accommodating for the securing of a child safety seat connector 34 to the anchor attachment loop bar 60.

With the above in mind, in further optional aspects, at block 206 the microprocessor control system 32 waits for a given time period after plate 74 motion has occurred or via a series of measurements over an amount of time, which confirms that the plate 74 has stopped moving, on the order of a few seconds to a minute, before determining and communicating the location of the plate 74 based on the control signal received from the sensing device 78. After the time period expires, at block 208, the microprocessor control system 32 determines whether the control signal value is greater than the "Installation Threshold" IT, if the control signal value is determined by the microprocessor control system 32 to be less than the "Installation Threshold" IT, then the process begins again at block 202.

If the microprocessor control system 32 determines that the control signal value issued by the sensing device 78 is greater than the "Installation Threshold" IT at block 208 then a determination is made as to the type of child safety seat connector 34 is coupled to the anchor attachment loop bar 60 at block 210 or if a foreign object has been placed in the anchor attachment loop 56.

For example, at block 210, a determination is made by the microprocessor control system 32 as to whether the control signal value issued by the sensing device is in a range that indicates a "First Connector Style" CC, such as a child safety seat connector 34 illustrated in FIG. 2C, is attached to the anchor attachment loop bar 60 at block 212 or in the range that indicates a "Second Connector Style" SC, such as a child safety seat connector 34 illustrated in FIGS. 2A and 2B is connected to the anchor attachment loop bar 60 at block 214. In aspects, upon determining that a connector 34 is attached to the anchor attachment loop bar 60, the microprocessor control system 32 disables an airbag 112 that is associated with the passenger seat 12. While the airbag 112 is illustrated as being positioned forward of the passenger seat 12 and anchor 16, airbags may additionally or alternatively be located in other positions, such as on either side of a passenger seat 12. In another aspect, upon determining that a connector 34 is attached to the anchor attachment loop bar 60, a signal can be sent to the microprocessor control system 32 that the child safety seat 10 is attached to the vehicle at this particular passenger seat 12. In yet further aspects, upon determining that a connector 34 is attached to the anchor attachment loop bar 60, additional or alternative ride actions may be taken, such as permitting a ride, communicating the presence of the child safety seat 10 to other control modules associated with a passenger seat 12 or vehicle, or the taking of personalized vehicle actions, such as the dimming of lights, the provision of particular music or sounds, limiting the types of music that may be played, dimly illuminating the child safety seat so a parent may observe a child secured in the child safety seat, etc.

If the control signal value falls outside of these ranges or any other programmed ranges after the plate 74 has stopped moving, then a determination is made by the microprocessor control system 32 that a foreign object is present in between the plate 74 and the anchor attachment loop bar 60 at block 216. If the determination is made that a foreign object is present, the microprocessor control system 32 may issue a warning to the occupant or perform a ride action, such as ending a ride in progress or not beginning a new ride.

In additional aspects, as alluded to above, the method 200 also determines whether the ties 20 coupled to the child safety seat connectors 34 are flexible or rigid at block 210. In such a method, a second anchor attachment sensor 30 is connected to a second anchor 16 associated with a given passenger seat 12, wherein the second anchor attachment sensor 30 includes the same, or substantially the same, components as the anchor attachment sensor 30 described above. Thus, the second anchor attachment sensor 30 will include a second sensing device 78 which transmits a second control signal having a second value to the microprocessor control system 32. At block 210, the microprocessor control system 32 measures a lapsed time period between the receipt of the first control signal and second control signal indicating that a child safety seat connector 34 is coupled to each anchor 16. If the lapsed time period is simultaneous or within less than a few seconds, such as less than a predetermined time period of 10 seconds or less, or 5 seconds or less, or 1 second or less, the microprocessor control system 32 determines the ties 20 are rigid. Otherwise, if it takes more than a few seconds, such as more than a predetermined time period of 5 seconds, the microprocessor control system 32 determines that the ties 20 are flexible.

In aspects, the method 200 is initiated at vehicle start, the opening of a door, or by the triggering of another sensor (not illustrated) such as a pressure sensor under the passenger seat 12 or an in-cabin sensor such as a camera. Further, the method 200 may be repeated at given intervals while the vehicle is in accessory mode or at given intervals while the vehicle engine is running or the vehicle is either moving or stationary.

An anchor attachment detection sensor of the present disclosure offers several advantages. These include the ability to detect the connection of a child safety seat connector to an anchor attachment loop of an anchor. The anchor attachment detection sensors are also relatively low profile compared to anchor attachment detection sensors affixed to other locations relative to the anchor. Further, the anchor attachment detection sensors may be easily interchanged by removing the anchor itself or replacing the sensor mechanism, without the need to replace other components in the passenger seat.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An anchor attachment detection sensor for a vehicle, comprising:
   an anchor including an anchor attachment loop bar;
   a slide mount defining an opening, wherein the slide mount is positioned aft of the anchor attachment loop bar;
   a slide positioned in the opening of the slide mount, wherein the slide includes a first end and a second end;
   a plate secured to the first end of the slide, wherein the plate is aft of the anchor attachment loop bar;
   a spring, wherein the spring biases the plate against the anchor attachment loop bar; and
   a sensing device configured to transmit a control signal having a value, wherein the value of the control signal is based on a location of a portion of the slide.

2. The anchor attachment detection sensor of claim 1, wherein the anchor attachment loop contains at least two anchor attachment loop side arms and the plate is located between the anchor attachment loop side arms.

3. The anchor attachment detection sensor of claim 2, wherein the plate includes at least two recesses that slidably interface with the at least two anchor attachment loop side arms.

4. The anchor attachment detection sensor of claim 2, wherein the slide is configured to move parallel to the at least two anchor attachment loop side arms.

5. The anchor attachment detection sensor of claim 1, wherein the sensing device is adjacent to the slide and the slide includes a sensible element, wherein the sensing device is configured to detect the sensible element.

6. The anchor attachment detection sensor of claim 5, wherein the sensing device is selected from the group consisting of an optical sensor, a proximity sensor, radar, linear variable displacement sensor, an ultrasonic sensor, and a piezo electric sensor.

7. The anchor attachment detection sensor of claim 1, wherein the slide includes a ferromagnetic sensible element and the sensing device is a metallic proximity sensor.

8. The anchor attachment detection sensor of claim 1, wherein the slide mount is at least one of a) attached to and fully supported by the anchor, b) attached to a cross member to which the anchor is attached, and c) attached to a bezel.

9. The anchor attachment detection sensor of claim 1, wherein the anchor is secured to a cross member in the vehicle and the slide mount is affixed to the cross member.

10. The anchor attachment detection sensor of claim 1, wherein a bezel surrounds the anchor and the slide mount is affixed to the bezel.

11. The anchor attachment detection sensor of claim 1, wherein the plate defines a front face that includes a vibration isolation material.

12. The anchor attachment detection sensor of claim 1, wherein the spring is a helical spring and the spring defines a tunnel through which the slide passes.

13. The anchor attachment detection sensor of claim 1, wherein the sensing device is connected to a microprocessor control system and the microprocessor control system is configured to execute an algorithm that determines if at least one of the following conditions is present: a) a child safety seat connector is located between the anchor attachment loop bar and the plate, b) nothing is between the anchor attachment loop bar and the plate, or c) a foreign object is located between the anchor attachment loop bar and the plate.

14. The anchor attachment detection sensor of claim 13, wherein the microprocessor control system is further configured to execute a second algorithm that determines a style of the child safety seat connector connected to the anchor attachment loop bar.

15. An anchor attachment system for a vehicle, comprising:
   a passenger seat;
   an anchor associated with the passenger seat including an anchor attachment loop bar;
   a slide mount defining an opening, wherein the slide mount is affixed near the anchor and positioned aft of the anchor attachment loop bar;
   a slide positioned in the opening of the slide mount, wherein the slide includes a sensible element;
   a plate secured to a first end of the slide, wherein the plate is aft of the anchor attachment loop bar;
   a spring, wherein the spring biases the plate against the anchor attachment loop bar; and
   a sensing device configured to transmit a control signal having a value, wherein the value of the control signal is based on a location of the sensible element.

16. A method of detecting the connection of a child safety seat connector to an anchor in a vehicle, comprising:
   transmitting a first control signal by a first sensing device, the first control signal having a first control signal value, wherein the first sensing device is configured to measure a first displacement of a first plate, wherein the first plate is biased against a first anchor attachment loop bar of a first anchor;
   receiving the first control signal value with a microprocessor control system coupled to the first sensing device; and
   determining if the first control signal value is greater than an installation threshold with the microprocessor control system,
   wherein if the first control signal value is greater than the installation threshold determining if a first child safety seat connector is coupled to the first anchor attachment loop bar, wherein if the first control signal is less than the installation threshold and not in a home range determining a foreign object is present between the first anchor attachment loop bar and the first plate, and wherein if the first control signal value is less than the installation threshold and in the home range determining that nothing is between the first anchor attachment loop and the first plate.

17. The method of claim 16, wherein prior to determining whether the first control signal value is greater than the installation threshold, determining that the first plate is no longer moving and again determining if the first control signal value is greater than the installation threshold.

18. The method of claim 16, wherein if the microprocessor control system determines the first control signal value falls within a predetermined range above the installation threshold, the microprocessor control system determines the first child safety seat connector is coupled to the first anchor attachment loop bar.

19. The method of claim 18, wherein the predetermined range determines a style of the child safety seat connector connected to the first anchor attachment loop bar.

20. The method of claim 18, further comprising transmitting a second control signal by a second sensing device, the second control signal having a second control signal value, wherein the second sensing device is configured to measure a second displacement of a second plate, wherein the second plate is biased against a second anchor attachment loop bar of a second anchor;
   receiving the second control signal value with the microprocessor control system coupled to the second sensing device; and
   determining if the second control signal value is greater than the installation threshold with the microprocessor control system;
   if the second control signal value is greater than the installation threshold determining if a second child safety seat connector is coupled to the second anchor attachment loop bar; and
   if the second child safety seat connector is coupled to the second anchor attachment loop bar further determining a lapsed time period between the coupling of the first child safety seat connector to the first anchor attachment loop bar and the coupling of the second child safety seat connector to the second anchor attachment loop bar,
   wherein if the lapsed time period is greater than a predetermined time period, the microprocessor control system indicates that the first child safety seat connector and the second child safety seat connector are using one or more flexible ties and if the lapsed time period is less than the predetermined time period, the microprocessor control system indicates that the first child safety seat connector and the second child safety seat connector are using one or more rigid ties.

* * * * *